United States Patent [19]
Wenzel

[11] 3,976,928
[45] Aug. 24, 1976

[54] TRACER MECHANISM HAVING SERVO POSITIONING TYPE CONTROL MEANS ASSOCIATED WITH PLURAL MOTORS

[75] Inventor: Robert H. Wenzel, Orange, Calif.

[73] Assignee: Textron, Inc., Providence, R.I.

[22] Filed: Mar. 26, 1974

[21] Appl. No.: 455,018

[52] U.S. Cl. ................................. 318/578; 318/39
[51] Int. Cl.² ..................... G05B 19/36; B23Q 5/28
[58] Field of Search ............. 318/578, 39; 336/134; 90/13.5, 62

[56] References Cited
UNITED STATES PATENTS

| | | | |
|---|---|---|---|
| 2,116,593 | 5/1938 | Bouvier et al. | 318/578 X |
| 2,313,989 | 3/1943 | Caldwell et al. | 336/134 X |
| 2,373,332 | 4/1945 | O'Neill | 318/578 X |
| 2,413,274 | 12/1946 | Wilkie et al. | 318/578 X |
| 2,511,956 | 6/1950 | Wetzel | 318/578 X |
| 2,820,162 | 1/1958 | Snell | 318/578 X |
| 2,866,153 | 12/1958 | Rhoades | 318/39 X |
| 3,292,495 | 12/1966 | Hill et al. | 90/13.5 |
| 3,457,484 | 7/1969 | Shimizu et al. | 318/378 |
| 3,467,899 | 9/1969 | Inaba et al. | 318/578 |
| 3,582,749 | 6/1971 | Wenzel | 318/571 |

*Primary Examiner*—James R. Scott
*Attorney, Agent, or Firm*—Donald D. Mon

[57] ABSTRACT

A tracer mechanism having a stylus to scan the surface of a pattern or a template and to cause a congruent relative movement of a cutter and a workpiece, whereby to reproduce the contour of the pattern or template in the workpiece. The stylus is provided with an axial force element which can adjustably vary the endwise thrust of the stylus, thereby to vary the reaction force of the stylus against the workpiece. As a consequence, the stylus can be caused more accurately to track the pattern or template along a tracing plane, especially on a pattern which has a steep slope that tilts laterally relative to the tracing plane. Means is also disclosed to utilize the axial force element in a machine tool table control wherein a "box-cycle" movement is made in which the cutting tool is withdrawn from the workpiece, is stepped to a new tracing plane, and is returned in a non-cutting motion to the starting point of a subsequent cutting movement parallel to the first one.

20 Claims, 20 Drawing Figures

RAPID APPROACH TO PATTERN

Fig.13B

FIRST CONTACT BY DISTENDED STYLUS

Fig.13C

STYLUS DISTENSION TERMINATED STYLUS RETRACTS RATE CONTROLLED APPROACH TO PATTERN

Fig.13D

STYLUS ON PATTERN READY TO TRACE

TRACER MECHANISM HAVING SERVO POSITIONING TYPE CONTROL MEANS ASSOCIATED WITH PLURAL MOTORS

This invention relates to a tracer-controlled machine tool and to systems and components for such tools.

Tracer mechanisms are widely known. Conventionally, they utilize one of two classes of tracer mechanisms. The first class is a hydraulic mechanism exemplified by Rosebrook U.S. Pat. No. 2,836,387 and by Weaver U.S. Pat. No. 3,055,393. Hydraulic tracer mechanisms are characterized by the inclusion of fourway valves which serve to control the bi-directional operation of hydraulic motors or relays which control bi-directional electric motors. The deflection of the stylus as a consequence of its contact with the pattern or template (for convenience, patterns and templates will be referred to interchangeably hereinafter as "patterns") sets the valve to a position where it passes power to machine tool motors that shift machine tool elements and the cutting tool relative to each other so as to duplicate the contour of the pattern in the workpiece.

Electrically controlled tracer mechanisms are exemplified by Stokes U.S. Pat. No. 2,837,707 and Wenzel U.S. Pat. No. 3,582,749. In this type of device, the deflection of the stylus is sensed by sensors (which may be linear voltage differential transformers, variable impedance members, and equivalents thereof) to produce a signal proportional to stylus deflection, which in turn controls the operation of electric motors for the same purpose as the hydraulic devices.

In the aforesaid Rosebrook patent, the operation of the tracer mechanism is in response to a "leading" stylus, meaning that the stylus tip is deflected in the direction of intended movement of the stylus relative to the pattern. In this arrangement, the control system attempts to nullify the deflection which is given to the stylus. In the Weaver, Stokes and Wenzel devices, the stylus "trails", and operates the motors in such manner as to tend to maintain a given deflection of the stylus. However, in both systems the intended operation is to restore the stylus to some relative position, whether it be a displaced or a null position.

This invention finds its primary utility in "trailing" stylus systems. However, it is also adaptable for use in the leading stylus operations, especially in connection with a boxcycle system disclosed herein.

Especially in the trailing stylus systems, the force reaction between the tip of the stylus and the pattern is a matter of considerable importance. This force is especially important when the system is tracing in a vertical plane which is defined by a vertical axis and one of its horizontal axes, and the machine cannot move along the third axis normal to the first two. Customarily, however, the stylus is free to be deflected in any lateral direction relative to the vertical axis including the third axis, as well as along the vertical axis, and therefore when a pattern has a steep slope tilted laterally to the plane in which the tracing cut is being made, it is possible for a substantial sideward force to be exerted on the tip of the stylus tending to deflect it sidewardly and for no machine tool movement to occur in response to it. The physical result of this sidewise deflection is to cause the cutter to gouge the workpiece. Because the amount of sideward deflection is a direct function of the endwise force exerted by the stylus against the pattern, it is advantageous to reduce the endwise force when sideward forces are being generated, and it is an object of this invention to provide a means for accomplishing this. The result is a more faithful reproduction of the contour of the tracing plane, accomplished without gouging the workpiece.

Similarly, it is advantageous to be able adjustably to vary the endwise load of the stylus against the pattern under any circumstances, because then it is possible for the stylus to trace over patterns of different hardness and resistance to wear. For example, plaster patterns instead of wood or metal patterns can be used if the stylus load is lighter. It is an object of this invention to permit the endwise force exerted by the pattern adjustably to be varied.

It is standard practice in duplicating patterns to make a tracer cut along a given tracing plane, and when the end of the cut is reached, then to step over or "pick" the stylus and the cutting tool to a new tracing plane. Frequently, the tracing is accomplished in a zig-zag motion with a pick movement occurring at each end of the stroke. However, there are considerable geometric disadvantages, and frequently it is necessary for all of the tracer cutting strokes to be made in the same direction. It is then necessary to return the cutting tool to a starting end for each stroke with the cutter removed from the workpiece and the stylus removed from the pattern in the return movement. It is advantageous to make this return movement as rapidly as possible. It is an object of this invention to provide means for causing the tracer mechanism and the cutter rapidly to be withdrawn from the workpiece at the end of a stroke, to be moved in pick movement, rapidly to be traversed back to the starting end of a stroke, rapidly to plunge toward the work, and at the last moment to be slowed down to an approach rate which is suitable for cutting the workpiece.

A tracer mechanism useful in this invention includes a body, a stylus having a generally vertical axis, mounting means mounting the stylus to the body for axial movement relative thereto, and an axial force element mounted to the body and effective to exert a selectible upward force on the stylus.

According to a preferred but optional feature of the invention, the axial force element may be made responsive to a signal from a power control means included in the tracer mechanism and responsive to the axis which is not under tracer control at the time.

According to another preferred but optional feature of the invention, the axial force element is under the control of an adjustably variable source of energy for energizing the same.

According to still another preferred but optional feature of the invention, the axial force element may be adapted for exerting a downward endwise axial force tending to distend the stylus, whereby the stylus tip can be used as a switch to terminate a rapid plunge of the cutter toward the workpiece as a consequence of its initial contact with the pattern or template.

It is another preferred but optional feature of this invention that the circuitry associated with the distention of the stylus may also be adapted to be controlled by a signal from a "virtual" pattern surface at some plateau level above the pattern which simulates the contact of the stylus with the pattern. This permits the use of this system under plateau level control.

The above and other features of this invention will be fully understood from the following detailed description and the accompanying drawings in which.

Figure 6:
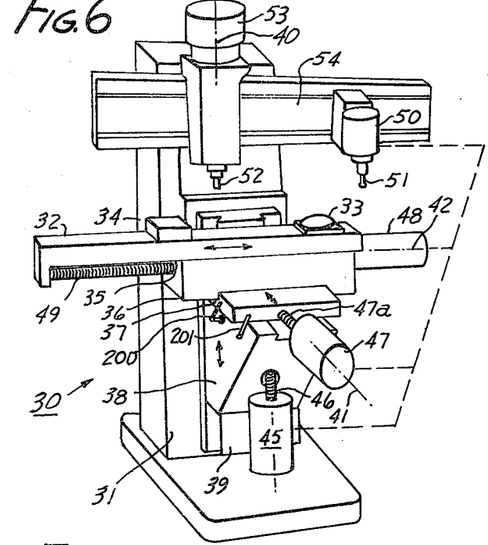
FIG. 6 is a perspective view of a portion of a machine tool utilizing the system and the tracer mechanism according to the invention.

In FIG. 6, there is a shown a tracer-controlled machine 30. It is a conventional tracer-equipped milling machine. The machine includes a table 32 upon which a pattern 33 (the term "pattern" including the term "template") and a workpiece 34 in which the contour of the pattern is to be duplicated by cutting it with a cutting tool.

A set of ways 35 mounts the table for right-left movement (X axis) relative to an intermediate member 36. The intermediate member 36 is mounted by ways 37 to a knee 38 for crosswise movement (Y axis). Knee 38 is mounted to the pedestal base 31 by ways 39 for vertical movement (Z axis). For convenience in discussion, the Z, Y and X axes (sometimes herein called first, second and third axes) are respective to ways 39, 37 and 35. The Z, Y and X axes are sometimes referred to as axes 40, 41, 42, respectively.

Movement of the system along the Z axis is caused by actuation of a bi-directional Z axis motor 45 mounted to the base which turns a Z axis lead screw 46 engaged between the motor and the knee. The turning of this lead screw in one direction or the other causes respective up or down movement of the knee. Movement along the Y axis 41 is caused by actuation of bi-directional Y axis motor 47 mounted to the knee which turns a Y axis lead screw 47a engaged between motor 47 and intermediate member 36. Movement along the X axis is caused by actuation of bi-directional X axis motor 48 mounted to the intermediate member which turns an X axis lead screw 49 engaged between the motor and the table.

Motors 45, 47 and 48 are all bi-directionally operable. and therefore the work table can be shifted by appropriate actuation of them so as to assume any position relative to the pedestal base within its limits of movement. It is the function of a tracer mechanism 50 to cause its stylus 51 to scan (to move along) the surface of the pattern 33, whereby the table will be shifted to move the workpiece 34 past a cutter 52 and duplicate the surface of the template in the workpiece.

The cutter is driven (turned) by a motor 53 to perform the cutting operation. It may be an end mill or other type of rotary cutter suited to the intended usage. The tracer mechanism is connected by means (not shown) to controls yet to be described for the purpose of causing the appropriate actuation of the respective motors. The tracer mechanism and the cutter are mounted to a horizontal rail 54 which is rigidly attached to the pedestal base. In addition to the tracer control shown, hand controls may be provided. They perform no part of this invention. Their details are familiar to persons skilled in the art, and are not described herein.

Figures 1, 2, 3, 4, 5:
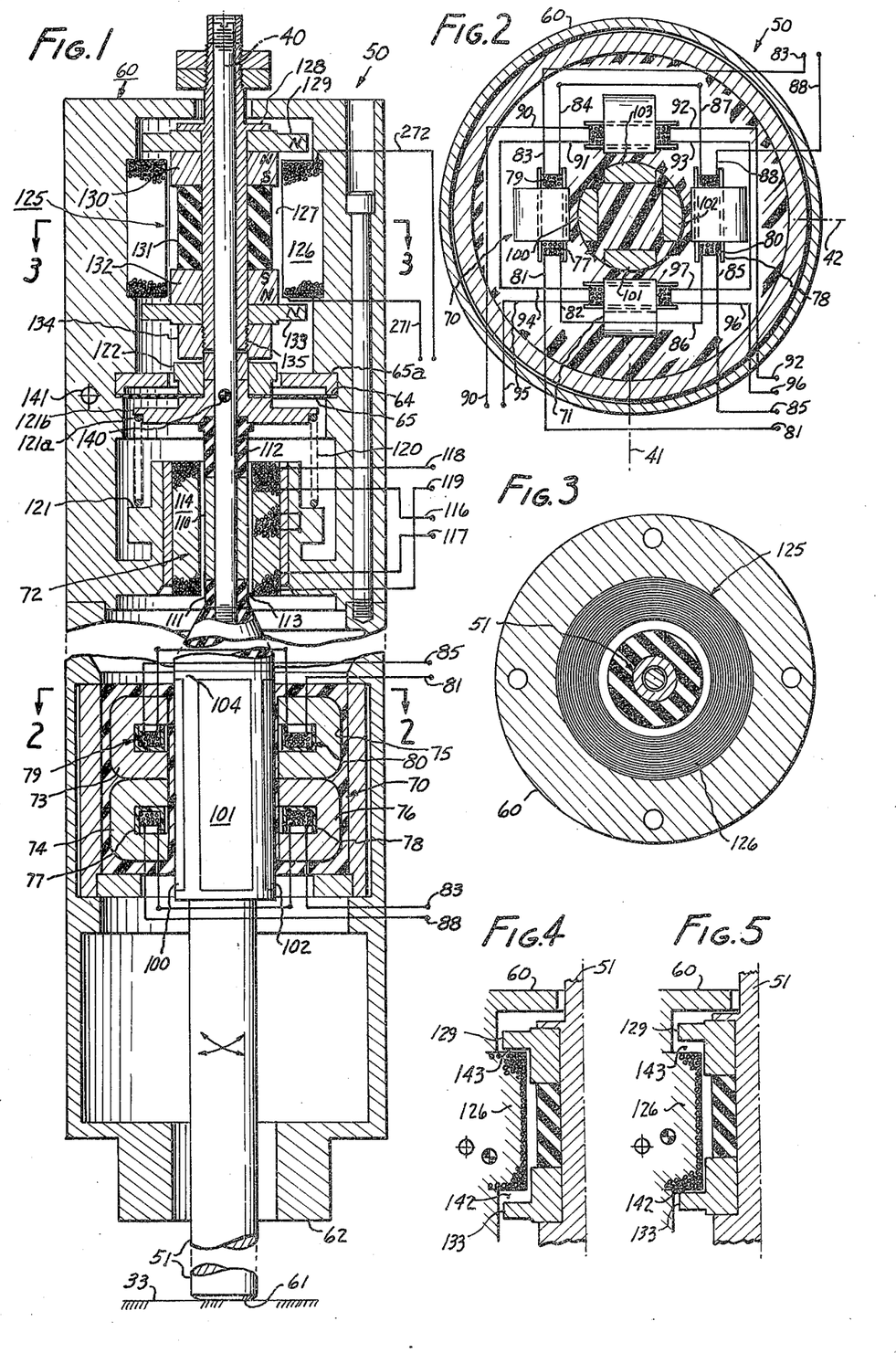
FIG. 1 is a side elevation, primarily in axial cross-section and partially in schematic notation, showing the presently preferred embodiment of a tracer mechanism according to the invention.
FIGS. 2 and 3 are cross-sections taken at lines 2—2 and 3—3, respectively, of FIG. 1.
FIG. 4 and 5 are fragmentary cross-sections of portions of FIG. 1 in two different operating conditions.

Tracer mechanism 50, as best shown in FIG. 1, includes a body 60 extending generally along Z axis 40. Stylus 51 is partially enclosed in the body. Its tip 61 projects beyond the lower end 62 of the body, and is free to move laterally in all directions relative to axis 40, i.e., in all directions in the X-Y plane defined by axes 41 and 42. The tip of the stylus can make contact with a pattern 33.

Stylus mounting means 65 is shown as a resilient, thin, flexible steel diaphragm clamped between shoulder 64 on the body and an insert 65a fitted to the body. This mounting means permits the stylus to move axially along axis 40, as well as to swivel as a consequence of movement of the tip laterally to axis 40, and biases the stylus to tend to make it return to the "null" position shown in FIG. 1. The null position is that wherein the axis of the stylus coincides with axis 40, and no active power control means produces a signal which activates a motor to move a machine tool element. Contact with the stylus can cause movement of the stylus tip along any of the three axes, depending on the configuration of the pattern.

X axis power control means 70, Y axis power control means 71, and Z axis power control means 72 are mounted to the body. They are responsive to changes in position of the stylus relative to the neutral positions shown in FIG. 1. At this position, the central, longitudinal axis of the stylus and Z axis 40 are coincident.

X and Y axis power control means are identical. Therefore, only the X axis means will be described in detail. As can best be seen in FIG. 1, it comprises four U-shaped core members 73, 74, 75 and 76 disposed in pairs on opposite sides of the axis 42. Plastic winding bobbins 77, 78 embrace two abutting arms of the core members and hold them against each other to form an E core. Windings 79, 80 are respectively formed on bobbins 77 and 78 and encircle the center leg of the E. Each of windings 79 and 80 includes a primary winding and a secondary winding, wound together around the bobbin and the central leg. Leads 81 and 82 are the primary leads for the primary winding formed around bobbin 77. Leads 83, 84 are the secondary leads for the secondary winding formed around bobbin 87. Leads 85, 86 are the primary leads for the primary winding formed around bobbin 78. Leads 87, 88 are the secondary leads for the secondary winding formed around bobbin 78. Similarly, secondary leads 90, 91, 94 and 95, and primary leads 92, 93, 96 and 97 are provided for the sets of primary and secondary windings formed around respective bobbins in the Y axis power control means which will be connected among themselves in the same manner as for those in the X axis power control means.

Four inserts 100, 101, 102 and 103 of ferromagnetic material are spaced apart from one another and are inserted in the wall of the stylus, located in a portion 104 thereof which has insulating and dielectric properties. Inserts 100 and 102 are respective to the X axis power control means, and inserts 101 and 103 are respective to the Y axis power control means. Their movement toward one core member in one direction also constitutes movement away from the other, and a differential signal proportional to the movement can then be obtained from each of the sets of X and Y axis control means as a consequence of such movement, because of the effect on the impedance of the secondary coils. This is a conventional arrangement in the art, and is more fully described in the said Wenzel patent. Electric motors can be controlled as a consequence of this signal.

To secure this signal, the primary windings are energized with a reference alternating voltage. The secondary windings of the X and Y axis power control means are respectively interconnected in series by connecting leads 84 and 87, and leads 91 and 94. The primary windings are similarly connected by connecting primary leads 82 and 86 in the X axis power control means, and 93 and 97 in the Y axis power control means. The primary and secondary windings on bobbins 77 and 78 are identical, and the respective elements are equally spaced from axis 42. The interconnected secondary leads are those which, when the central axis of the stylus is coincident with the Z axis 40, energizing of the primary windings produces a unique output at secondary leads 83 and 88 (for the X axis power control means) and secondary leads 90 and 95 (for the Y axis power control means) when the respective primary winding is energized by applying voltage at primary leads 81, 85 or 92, 96, as appropriate, and the output from the respective secondary leads increases or decreases with lateral displacement of the stylus, and with the algebraic sense of the increase or decrease indicative of the direction of displacement.

The Z axis power control means 72 comprises a ferromagnetic slug 110 mounted between two insulating sleeves 111, 112 inside a passage 113 formed by coil member 114. The coil member may be a conventional linear voltage differential transformer. Its general construction is that of a primary winding and a pair of axially spaced-apart interconnected secondary windings wound with the primary winding. The details of construction are conventional. The secondary windings are serially interconnected in the same manner as those on bobbins 77 and 78, and for the same purpose. When the slug is centralized between them, at a null position along the Z axis, there will be a unique, perhaps zero, output from secondary leads 116 and 117. Movement of the slug 110 in one axial direction or the other means movement toward one of the secondary windings and away from the other. This differential movement gives rise to a signal at secondary leads 116 and 117. The primary winding is energized by an alternating current applied at primary leads 118, 119. The amount and direction of axial movement of the stylus up and down in FIG. 1 can therefore be sensed, and a power control signal can be obtained from the secondary leads of power control member 72, which is proportional to the axial shift of the stylus.

The components and directions of displacement of the stylus along the X and Y axes will be detected by respective windings of X and Y axis power control means 70 and 71. Components and directions of displacement of the stylus along the Z axis will be detected by the Z axis power control means 72. The power control means which are selected are energized by an alternating current in phased quadrature relationship to one another in accordance with conventional arrangements. The Wenzel patent shows such an arrangement.

The weight of the stylus is partially counterbalanced by a compressed coil spring 120. Spring 120 rests on a shoulder 121 in the body. The upper end 121a of the spring bears against a flange 121b which is attached to the stylus. The inner edge of the stylus mounting means 65 is clamped to flange 121b and thereby to the stylus by a retainer 122. The stylus mounting means 65 is the primary mounting means that supports the stylus for movement along the three axes. Spring 120 counterbalances some of its weight without causing the stylus to assume any unique position. By changing the compression (preload) on the spring 120, or substituting springs with different characteristics, or by using a stylus having a different weight, the endwise load exerted by the stylus can be adjusted or changed, and so can the force required to shift the stylus along the Z axis, but this is not a variable adjustment in the sense of a running adjustment made in response to circumstances as they occur. For a "running" adjustment, axial force means 125 is provided.

Axial force means 125 (the term "axial force element" is used interchangeably with this term) is formed at an upper portion of the stylus. It includes an electrically conductive winding 126 wound around central axis 40 and spaced from structure within it. It forms a passage 127 which passes the stylus. Beginning at the top of the axial force member in FIG. 1, the stylus includes a shoulder 128 which bears against a stator that comprises a magnet 129 that in turn bears against another magnet 130. Next in order there follows an insulating, non-magnetic, spacer 131 of a material such as phenolic micarta, followed by another pair of magnets 132, 133. The magnets are made of ferromagnetic material. A nut 134 is threaded to a thread 135 on the stylus to hold the component parts together. The polarity of magnets 129 and 133 is identical. For example, they may be both north poles as shown, or may both be south poles instead. The polarity of magnets 130 and 132 are oppositely directed from one another, and the ends of magnets 129 and 133 overhang the ends of the winding, and extend axially beyond it. Flow of current through winding 126 in one direction will attract one of these poles more strongly than the other, and vice versa, so that flow of current through the coil in one direction or the other will tend to exert a force on the stylus by attracting one or the other of the magnets 129 or 133 toward the winding in a respective direction. This will shift the stylus along the Z axis in a selected direction. Thus, a force, which is relatively constant and directly proportional to the current passed through winding 126, can be exerted on the stylus to move it in either direction. The effect of this force, when it is upward, is to reduce the endwise force exerted by the stylus. Of course, depending on the springing arrangement, this may also tend to cause a retraction of the stylus, but this is not its primary intended effect. The primary intended effect is to reduce the endwise load of the stylus against the pattern and thereby reduce the tendency of the stylus to be deflected sidewardly.

In the other direction of current flow, when the force is downward, distention of the stylus is in fact intended, and the stylus will be shifted downwardly relative to the body for purposes yet to be described. Any movement which occurs as a consequence of energizing the axial force means will be detected by the Z axis power control means. The resulting signal can be utilized in a manner yet to be described.

For convenience in reference to various parts of the tracer mechanism, a target 140, comprising a circle with two light and two dark segments, is placed to show a reference datum point on the stylus itself which travels along the Z axis with the stylus. A second target 141, in the form of a star comprising a circle and two crossed arms, shows a datum point on the body, which datum point is also referenced relative to the machine tool structure that serves to mount the tracer mechanism. Therefore, when the tracer stylus moves upwardly relative to the body, target 140 moves upward relative to target 141, and vice versa.

Downward movement of the stylus, occasioned either by normal operation or by energizing the axial force means, is shown in FIG. 4, wherein spacing 142 is enlarged and spacing 143 is reduced. This is the condition referred to as stylus "distention". In FIG. 5, spacing 142 has been reduced and spacing 143 has been increased, and this is a consequence of upward movement of the stylus. The relative conditions of the targets 140 and 141 are shown adjacent to the respective FIGS.

Figure 7:
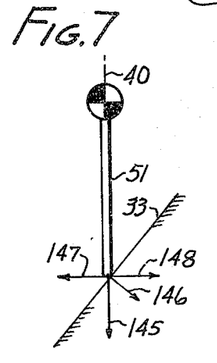
FIGS. 7 and 8 are schematic drawings showing certain geometric considerations involved in this invention.
Figure 8:
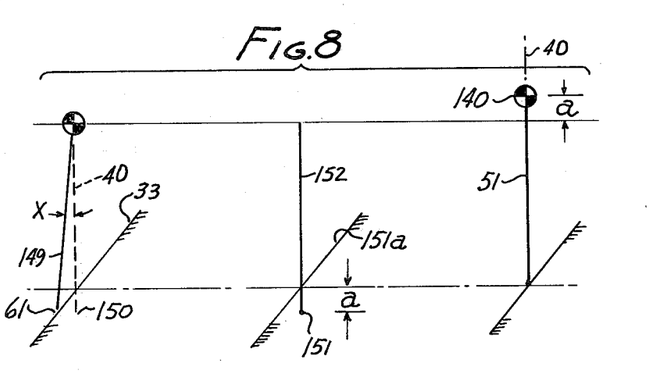

A problem inherent in conventional tracer mechanisms which utilize a stylus which is movable along three axes, and the present solution to this problem, is partially indicated in FIGS. 7 and 8. FIG. 7 shows stylus 51 in contact with a pattern 33 which slopes downwardly and to the left laterally relative to a tracing movement in a plane normal to the plane of FIG. 7 and inclusive of axis 40. The endwise force 145 is shown by its respective vector, and the normal force against the pattern is shown by vector 146. The resultant lateral deflection force 147 is shown as a reaction to vector 148. The problem is that, as the stylus scans along the surface of pattern 33 in contact therewith, and especially if the surface changes direction, there may be exerted a cramping force exemplified by vector 147 which tends to deflect the stylus to the side as shown by line segment 149 in FIG. 8. The stylus now stands at an angle X relative to axis 40, but the machine tool cannot respond in this axis, or "know" that this angle exists. Axis 40 lies in the axis of the intended tracing plane. The tip 61 of the stylus is actually in contact with the surface of pattern 33, but the theoretical point 150, at which the machine tool system expects the stylus tip to be, is beneath the surface of the template. As a consequence, the cutting point 151 of the cutter now is spaced by a distance $a$ below the surface 151$a$ of the workpiece. Line 152 symbolizes the spacing between the cutting tool and the machine tool frame, just as the dotted line segment of axis 40 between the target and tip 150 symbolizes the spacing between the stylus mounting point and its tip. Of course, the scale is very different in an actual machine, but the illustrated result does occur unless a provision is made to avoid it. The consequence of the cramping movement is a gouging of the workpiece.

Obviously, the proper alignment of the tracing device is that which is shown in the right-hand portion of FIG. 8, wherein target 140 shows that stylus 51 would have to raise relative to the template by the distance $a$ in order that its central axis may again coincide with the Z axis 40. This is the conventional objective of tracer-controlled systems, and the tendency is for the follower machine to seek this level, but the control must be appropriate for the purpose. There is the uncertainty, as exemplified by the left-hand segment of FIG. 8, that because the tracer mechanism is movable only in a single plane and is insensitive to deflection in the axis not included in the cutting plane, the cutting tool and stylus tip may not be correctly related. For example, if there is deflection on the X axis when the cutting plane is the Y-Z plane, the machine cannot "tell" the difference, and gouging can result. Accordingly, it is the object of this invention to create a situation wherein the stylus itself tends to exert such a minimum endwise force as will reduce the lateral deflecting force 147 to such a value as will prevent, or greatly reduce, the situation exemplified in the left-hand segment of FIG. 8. The stylus tip will then tend to "track" the stylus with greater fidelity, and deflect less, if at all, to the side because, if the sidewise force does not exist, then that situation will not occur, or if it does, it will be in such a small amount as can readily be corrected by the normal operation of the machine itself. Also, frictional drag is of importance to the size of the sideward force and diminishes as the end load is reduced.

Accordingly, a signal from that one of the power control means which is not included in the cutting plane is intended to be applied to the axial force means when deflection occurs in the nonselected axis. This will apply an upward force on the stylus, whereby to lessen the endwise force of the stylus tip against the pattern when a lateral deflection begins to occur. The advantage of such an arrangement is that it occurs very quickly and as a consequence of such a relatively slight deflection that the stylus does not succeed in deflecting very far to one side. An advantage in treating the problem in this manner, as contrasted with the technique utilized in Hill U.S. Pat. No. 3,292,495 to attempt to accommodate the problem, is that there is no confusion or mixing of the signal from the inactive axis with the output signal of the active Z axis power control means as provided to the motors. In the instant invention, the Z axis power control means provides a signal representative only of the displacement of the stylus relative to the tracer body, and only this signal is used to operate the Z axis motor. Any signal derived as a consequence of lateral deflection of the stylus along the axis not included in the tracing plane simply serves to reduce the endwise force on the stylus and does not modify or change the Z axis output signal from the Z axis power control means.

Accordingly, a method according to this invention for utilizing the axial force means includes the provision of means to select one of the X and Y axes, together with the Z axis, thereby to determine a cutting plane, and then applying any signal from the power control means of the axis not included in the cutting plane to the axial force means. The latter feature applies an upward axial force on the stylus as a consequence of any lateral deflection of the stylus along the non-selected axis. Circuitry to make these selections is standard and requires no description here. It merely constitutes the appropriate setting of standard selector switches. The turns of the windings and the actual dimensions used for the various components are readily designed or selected by persons skilled in the art, and also require no detailed description for an understanding of the invention.

Figure 9:
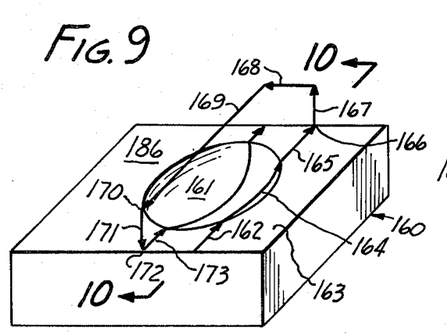
FIG. 9 is a perspective view of a pattern being traced.

Another use of the tracer mechanism shown in FIG. 1 is in the cutting of a workpiece in a manner commonly referred to as a "box-cycle". A basic box-cycle is shown in FIG. 9, wherein a tracing path of the stylus tip over a pattern is shown. A geometrically congruent path will be caused to be traced between a cutter and a workpiece by responsive actuation of the motors, in this case, the Y and Z axis motors.

In FIG. 9, there is shown a pattern 160 with a depression 161 to be reproduced in a workpiece. In many tracing applications, it is suitable to make a trace cut in one direction, to pick to a new cutting plane parallel to the first but laterally displaced from it, and then cut in the reverse direction, thereby cutting under tracer control in both directions across the pattern. However, there are situations in which the cuts should be made in only one direction. This latter class of operation utilizes a box-cycle in which the cutter and stylus are withdrawn from the work and pattern and returned through the air to a position where the stylus approaches and again contacts the pattern, and a new cutting path is resumed, but in the same direction as the first.

In the box-cycle shown in FIG. 9, an initial segment 162 extends along a flat upper surface 163 of the pattern, then segment 164 dips into the depression, comes up to the top of the pattern, and another segment 165 goes to the limit 166 of this trace cut. This limit is usually established by a limit switch or some other means to indicate the end of the trace cut. The trace cut constitutes segments 162, 164 and 165. Segment 167 is a retract movement into the air and away from the pattern for aa distance sufficient to clear obstructions. The extent of this movement is usually established by a limit switch.

Segment 168 represents a pick movement which is the spacing between adjacent cutting planes. Its spacing is determined by distance measuring means, or by timers, or any other means which is responsive to movement in "pick" mode of a predetermined amount.

Segment 169 represents a traverse, which is preferably a rapid traverse along the Y axis and through the air to a point 170 which is above the intended starting point of the next trace cut. The limit of this movement is usually established by a limit switch.

Segment 171 is an approach segment that terminates at point 172. Point 172 is the starting point of a new trace cut 173. The details of controlling motion along segment 171 will be further discussed below. This is a conventional box-cycle and concerns itself with the cutting of a depression in a workpiece.

Figure 10:
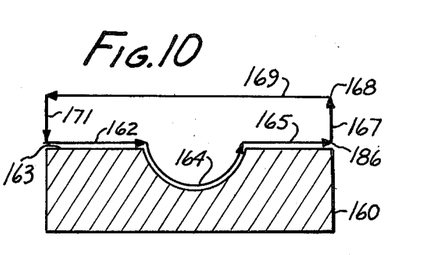
FIG. 10 is a cross-section taken at line 10—10 of FIG. 9.
Figure 11:
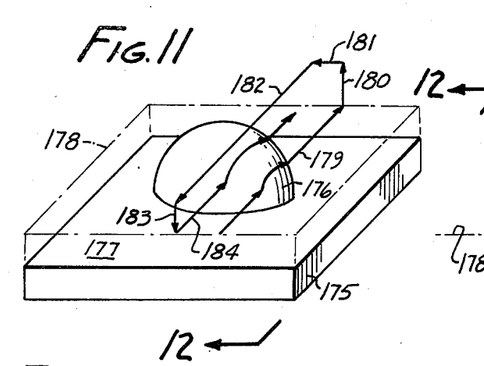
FIG. 11 is a perspective view of another pattern being traced.
Figure 12:
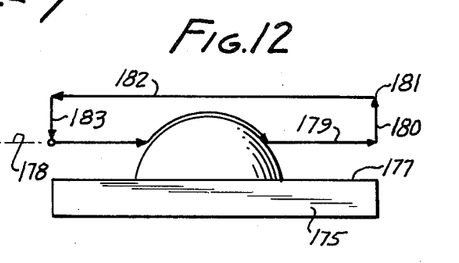
FIG. 12 is a right-hand side view taken at line 12—12 of FIG. 11.

In FIG. 11, the problem is somewhat different from that of FIG. 9, because its pattern 175 has a rise 176 instead of a depression, and it is often not feasible to cut this rise while working from a final intended lower pattern surface 177. Instead, it is usual for a technique known as "plateau" tracing to be utilized, one such plateau 178 being shown, which is above level 177. After the tracing is completed in this plateau, then another plateau, usually displaced downwardly from it, will be selected, but the box-cycle will be repeated time after time within each plateau selection until the respective plateau has been completely traced. For example, a first trace cut 179 is shown followed by a retract segment 180, a pick segment 181, a traverse segment 182, and an approach segment 183, followed by a new trace cut 184, just as in the arrangement of FIG. 9, and, except for segment 183, utilizes the same controls. The difference between the systems of FIGS. 9 and 10 is that in FIG. 9, the stylus returns to make contact with a surface 163 of pattern 160, while in FIG. 11, it returns to a "virtual" surface, i.e., a plateau 178 or imaginary surface above the pattern, to start the next box-cycle. The consequences of these distinctions will be discussed below.

It is an objective of this invention to utilize the tracer mechanism of FIG. 1 to enable the approach segments 171 and 183 to be made at a maximum safe rate, in the situation of FIG. 9 utilizing the stylus as a switch and safety means to sense the actual approach to the pattern, and in both cases to utilize the proximity to either the pattern or to the virtual plane (plateau) then to shift the machine into a rate-controlled movement appropriate to a proper speed of cutting into the metal of the workpiece.

Figure 13A:
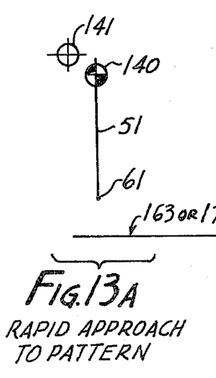
FIGS. 13A – 13D are schematic geometric illustrations, illustrating certain conditions which occur in the operation of this invention.
Figure 13B:
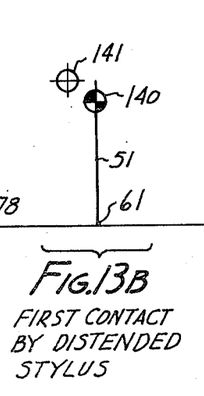
Figure 14:
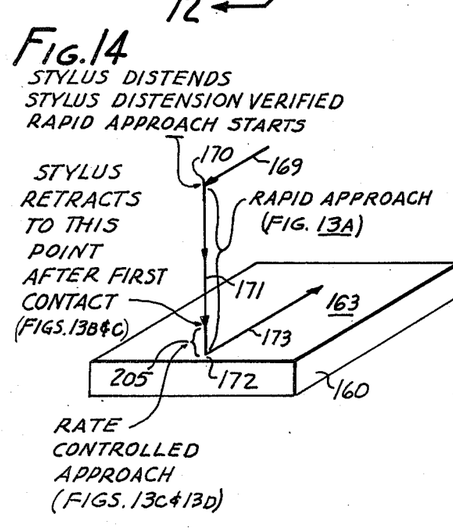
FIGS. 14 and 15 are fragmentary schematic views showing in greater detail portions of box-cycle movements accomplished with this invention.
Figure 15:
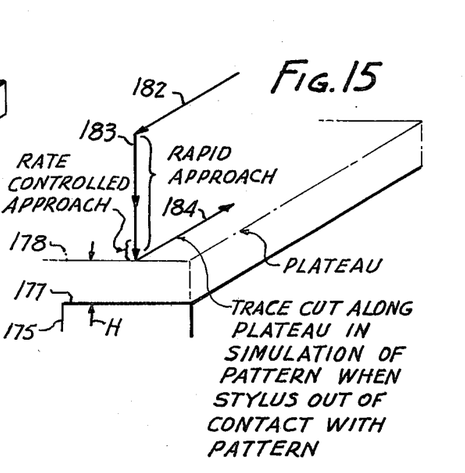

FIGS. 13A–13D show the general scheme of control of motion along segments 171 or 183. When the limit of the traverse movement has been reached, a signal will be generated which activates the axial force means to distend the stylus. However, the Z axis motor is disabled so that prior verification of distention can be made in order that the plunge toward the pattern, relying on distention for termination of a rapid plunge, will not be started unless the distention has in fact occurred. This is sensed by reading the value of the Z axis power control means output. If it corresponds to distention, then the Z axis motor is operated independently of the tracer mechanism at a rapid rate of plunge. FIG. 13A shows the rapid approach toward the pattern, wherein the axial force means has been energized so as to distend the stylus in a downward direction. Target 140 is therefore below target 141. The tip 61 of the stylus is, of course, above the surface 163 of pattern 160 or above the virtual plateau 178 of FIG. 11, whichever is being utilized. FIG. 13B shows the arrival of the tip of the stylus at the surface or plateau. In either situation, there will be a signal of this event. In FIGS. 9 and 14, the signal is the change in output of the Z axis power control means as a consequence of deflection of the stylus tip by the pattern. The signal was at a maximum when the stylus was distended, and physical retraction causes it to decrease, and this signal is used to terminate the stylus distention. In FIGS. 11 and 15, the arrival at the plateau is sensed by distance measuring means which generates a like signal and causes termination of stylus distention.

Figures 13C, 13D:
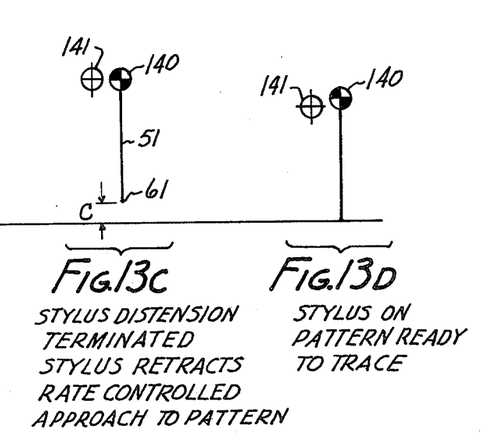

FIG. 13C shows the result of the signal wherein the stylus distention is terminated. The stylus will mechanically be retracted so that targets 140 and 141 are at the same elevation, and the tip of the stylus is spaced by a spacing C from the template surface or the plateau. At this time, the system will be shifted into a rate-controlled approach suitable for the cutting for the metal of the workpiece (not under control of the tracer mechanism, but instead a pure Z axis feed), because such cutting may be occurring, depending on the configuration of the pattern of the workpiece. This approach will continue until the stylus again makes contact with the surface or plateau and achieves a deflection characteristic of a tracing movement. This condition is shown in FIG. 13D, by the position of target 140 being above that of 141. Now the device is ready for the next trace cut, and the next trace cut is begun as a consequence of the indication from the power control means that an adequate stylus deflection has been achieved.

Accordingly, it is the scheme of this invention to distend the stylus for the rapid approach to the pattern, to retract at a position close to or upon the pattern to shift into a rate-controlled approach, and then after the proper deflection is achieved, to start a trace cut. Accordingly, a safe template approach, and an optimally rapid box-cycle, are obtained.

In the arrangement of FIGS. 11 and 15, distance measuring means provides a signal simulative of the proper deflection after the plateau has been reached. This arrangement therefore utilizes all features of the arrangement of FIGS. 9 and 14, except that signals are provided from sources other than contact between the stylus and the pattern to indicate arrival at a given level or plateau. FIG. 15 shows the similarity.

The details of construction of circuitry and equipment to operate the motors and shift the machine tool elements so as to complete the box-cycle are totally standard. The Wenzel patent shows such a system and may be referred to for many details. The tracer mechanism provides signals from its power control means to control the application of power to the motors so as to shift the machine tool elements in the tracing mode. Direct application of power to respective motors can be made in the retract, pick, traverse, and approach segments, without control by the tracer mechanism.

As for the cycling of the machine tool elements in the box-cycle, it is conventional for machine tool elements to carry limit switches which can be set to indicate the end of desired travel, and accordingly there is schematically shown Y axis limit switches 200 and 201 mounted to the table and to the intermediate member respectively which can be slidably set to limit the movements of the extent of the trace cuts along the Y axis. A similar switch (not shown) can be provided to terminate the retract motion. Pick movement may readily be controlled by distance measuring devices, timing devices, or the like, the details of which are unimportant to the invention.

Figure 17:
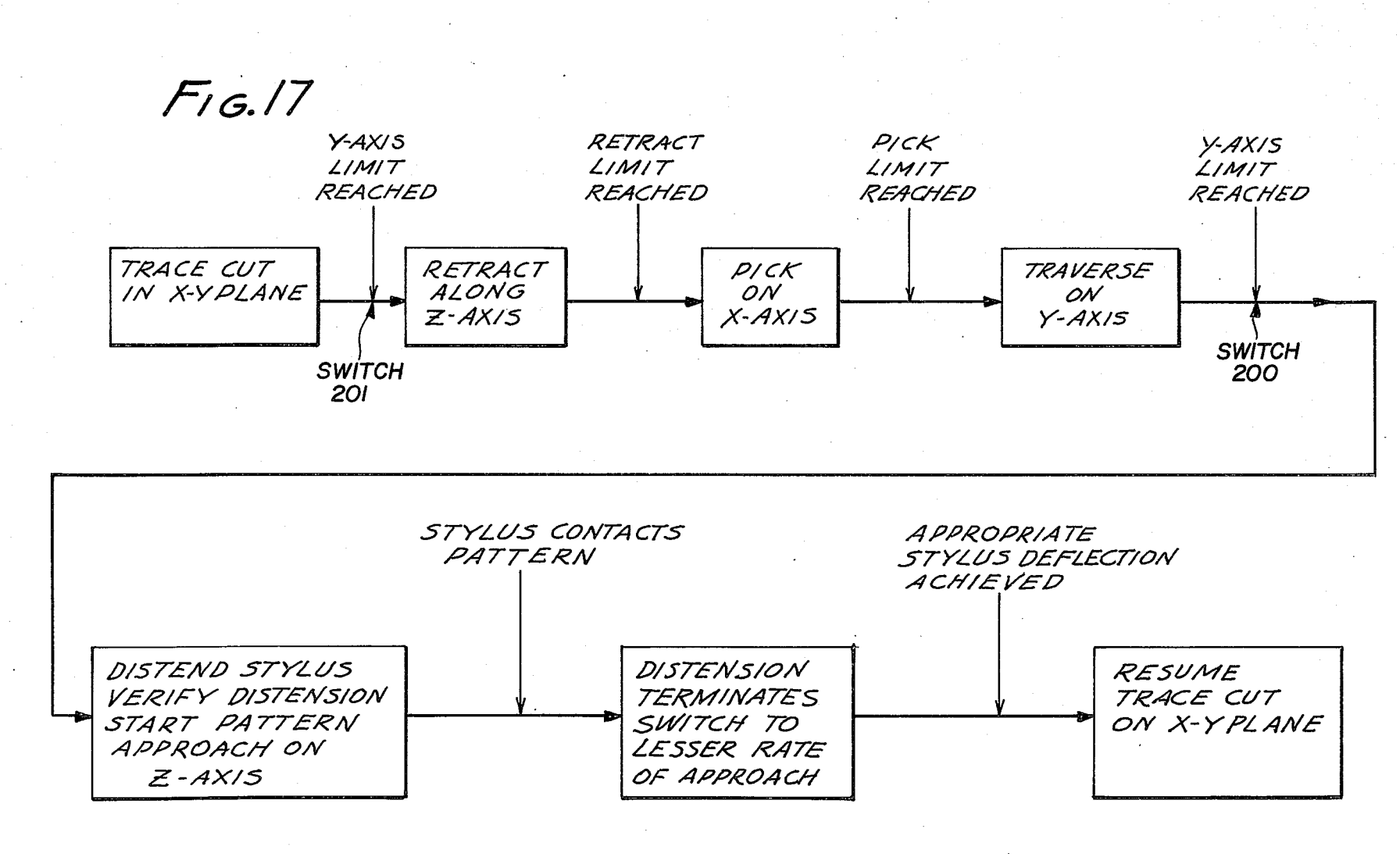
FIG. 17 is a schematic switching plan for accomplishing one of the methods of the invention.

Limit switch 201 will terminate the first trace cut in FIG. 9, and limit switch 200 will terminate the rapid traverse segment 169. They are each adapted to engage adjacent machine tool elements when the desired amount of motion has taken place. Sequencing circuitry and the like to connect the motors one after the other to appropriate circuitry as a consequence of reaching the established limits are entirely conventional and may readily be constructed by persons skilled in the art. FIG. 17 shows their interposition between various circuit configurations. It also illustrates a method of the invention.

In the operation of the system of FIG. 9, the trace cut will occur until limit switch 201 is struck terminating that movement, switching on the Z axis motor to lower the table relative to the template and the cutting tool until both the stylus tip and the cutting tool clear the respective pattern and workpiece by a predetermined amount. When the extent of that movement is completed, as evidenced by some limit means, circuitry is aligned to activate the X axis motor and accomplish the pick movement. After the pick movement is completed, circuitry actuates the Y motor to complete the segment 169 that in turn is terminated by the operation of limit switch 200.

At this time, circuitry is energized which causes the flow of current through the coil of the axial force element to cause the condition of FIG. 4. This distends the stylus, and its distention is verified. The output from the Z axis power control means is sensed, and it will be large because of the distention. This verifies the fact of distention. Upon verification of this fact, the Z axis motor is energized to cause the rapid approach of the template at a rate which is not related to the cutting of metal. This motion may continue as long as the signal from the Z axis power control means indicates the full distention of the stylus. However, when the condition of FIG. 13B is reached, a slight upward displacement of the stylus occurs, and then the Z axis power control means output will be changed. This change will immediately be sensed and cause the operation of the Z axis motor at its rapid rate to be terminated. Also, this will cause the circuit to the axial force element to be opened, and the stylus will quickly retract to the position shown in FIG. 13C.

At this time, the circuitry energizes the Z axis motor, but at a lesser rate, which is suitable to the cutting of the metal workpiece, because at this time, cutting may occur depending on the relative configurations. This is segment 205 in FIG. 14. As soon as the necessary deflection for the trace cut is obtained as shown in FIG. 13D, this fact will be determined by the output of the Z power control means. The circuitry will be switched to cause the tracing to occur again in the X-Z plane, having been stepped over from the previous plane by the pick distance. The foregoing method of operation is readily attained by completely conventional circuitry which can be constructed by persons skilled in the art.

When the box-cycle utilizing the plateau control is accomplished as in FIG. 15, it is evident that no physical contact with the template will occur during the approach movement. Accordingly, "virtual" means is used, such as a potentiometer whose response caused by the relative movement of machine tool elements along the Z axis, indicates that the tracer mechanism has travelled a distance simulative of the length of segment 183. When this has been accomplished, then the same circuitry is utilized as before by providing a "virtual" signal to the cycling devices, causing a retraction of the distended stylus followed by a further pattern approach movement by a measured amount to the new plateau, following which still another "virtual" signal similarly is provided to the circuitry so as to cause a feed movement by applying a simulated stylus deflection signal to the circuits so as to cause movement along segment 184. An operative signal will be generated by the stylus when it is in contact with the pattern. When it leaves the pattern, if it does so before the limit of the cutting stroke is reached, the "virtual" stylus signal will be resumed to maintain the feed motion. It simulates the contact of the stylus tip with a planar surface.

Figure 16:
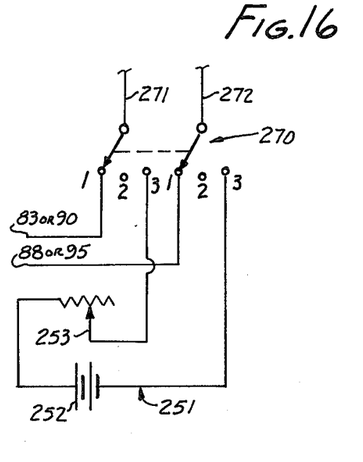
FIGS. 16 is a circuit drawing of another portion of the invention.

FIG. 16 shows a means for utilizing the axial force means adjustably to vary the endwise force of the stylus, but on both a manually adjustable, and running adjustment, basis. The common terminal of selector switch 270 is connected to the leads 271, 272 from the axial force element. Leads 83 and 88, or 90 and 95, are connected to one set of its terminals, depending on whether the X or Y axis is chosen. This provides for the running adjustment.

The third terminals are connected to a circuit 251 which includes a battery 252 and a variable resistor 253. Then, by connecting the common terminals to the third terminals, a selected and adjustable current can be supplied to the axial force means to establish endwise load of the stylus. Circuit 251 is sometimes called "stylus compensation means", because it can compensate for some of the weight of the stylus.

In conventional machinery, limit switches such as limit switches 200 and 201 are generally provided for all three axes, and they will be used when the feed movement for the trace cut is along the respective axis, just as switches 200 and 201 are used when the Y axis is the feed axis. Similarly, distance measuring means are provided for all three axes, and used to limit pick movement along the respective axis. When the axies are selected for trace cut and pick movement, the respective limit switches and distance measuring means will also be selected. Accordingly, this invention is effective for picking in the Y-Z plane as well as in the X-Z plane. When virtual signals are to be provided, the distance measuring means can be set to activate circuitry appropriate to the desired response whenever the given distance has been travelled. This in the box-cycle mode of operation, either the X or Y axis can be the feed axis, and the other can be the pick axis. The Z axis will always be the retract and approach axis.

This invention thereby provides a tracer mechanism which is provided with an axial force means for adjusting the endwise thrust force of a stylus against a pattern and also of making this adjustment on a continuing basis, depending on the relative configuration of the pattern whereby to diminish the tendency of the stylus to be laterally displaced as a consequence of a steep slope relative to its path. As a consequence of its construction, the axial force means can either distend the stylus, or lessen its endwise force, by choosing the direction and amount of current passed therethrough. Means according to the invention also enables utilizing the distended stylus as a switch means to sense the nearness of the tracer mechanism to a pattern so as to permit an initial rapid approach to the pattern and a subsequent rate-controlled approach after it has come close to the pattern. The invention is accomplished with straightforward conventional circuitry and tracer mechanism considerations.

This invention is not to be limited by the embodiments shown in the drawings and described in the description, which are given by way of example and not of limitation, but only in accordance with the scope of the appended claims.

I claim:

1. A tracer mechanism for controlling the application of power to motors that move machine tool elements whereby to cause movement of a workpiece relative to a cutting tool as the consequence of the tracing of a pattern by the tracer mechanism, said tracer mechanism comprising: a tracer body; a stylus having a free tip and an axis generally aligned with a first axis; mounting means mounting said stylus for pivotal movement in a plane defined by said first axis and by a second axis normal thereto, and for axial shifting movement along the said first axis; first and second power control means mounted to said body, the first power control means being responsive to axial shifting of the stylus along the first axis, and the second power control means being responsive to components of deflection of the stylus tip along said second axis, each of said power control means being adapted for connection with a respective motor which causes movement along the respective axis to control the direction and speed of operation of said respective motor; and an axial force element mounted to the body and effective when energized by the passage of an electrical current therethrough to exert an axial force on said stylus along said first axis.

2. A tracer mechanism according to claim 1 in which the axial force element comprises electromagnetic means.

3. Apparatus according to claim 1 in which the axial force means comprises an electrically conductive winding mounted to the body, and a stator fixed to the stylus, whereby energizing the winding by passing an electrical current therethrough creates a magnetic circuit with the stator and exerts said force.

4. Apparatus according to claim 3 in which the stator comprises a pair of magnets, each extending axially beyond a respective end of the winding, the polarity of their opposite ends being identical, whereby passage of current in one direction through the winding applies said force in one axial direction, and passage of current in the other direction through the winding applies said force in the opposite axial direction.

5. Apparatus according to claim 3 in which adjustable stylus compensation means is provided adjustably to vary the current applied to the winding, whereby adjustably to vary the force exerted by the axial force means.

6. Apparatus according to claim 2 in which adjustable stylus compensation means is provided adjustably to vary the current applied to the winding, whereby adjustably to vary the force exerted by the axial force means.

7. Apparatus according to claim 1 in which said mounting means mounts the said stylus for pivotal movement and lateral displacement of its tip in all directions lateral to said first axis, including a third axis which is normal to both the first and second axes, and in which third power control means is mounted to said body, the said third power control means being responsive to components of deflection of the stylus along the third axis, whereby said three power control means respond to movement of the stylus along three axes, and can provide control for movement of a machine tool element along any of said three axes as the consequence of the tracing of the pattern by the tip of the stylus.

8. Apparatus according to claim 7 in which the mounting means is a spring.

9. Apparatus according to claim 7 in which the mounting means is a flexible and resilient diaphragm.

10. Apparatus according to claim 7 in which the mounting means is resilient.

11. Apparatus according to claim 7 in which the axial force element comprises electromagnetic means.

12. Apparatus according to claim 17 in which the axial force means comprises an electrically conductive winding mounted to the body, and a stator fixed to the stylus, whereby energizing the winding by passing an electrical current therethrough creates a magnetic circuit with the stator and exerts said force.

13. Apparatus according to claim 12 in which the stator comprises a pair of magnets, each extending axially beyond a respective end of the winding, the polarity of their opposite ends being identical, whereby passage of current in one direction through the winding applies said force in one axial direction, and passage of current in the other direction through the winding applies said force in the opposite axial direction.

14. Apparatus according to claim 7 in which the second and third power control means each comprises a pair of E cores having three generally parallel arms, a primary and a secondary winding on each of the E cores, and ferromagnetic means carried by said stylus adjacent to each of said E cores, said primary and secondary windings being so interconnected that a unique electrical signal is derived from the secondary windings when the primary windings are energized and the stylus axis is coincident with said first axis, and a different electrical signal different from said unique signal, and representative of the direction and amount of the respective axial component of deflection of stylus in the respective axis, is derived therefrom when the stylus tip is deflected laterally of the first axis.

15. Apparatus according to claim 14 in which the first power control means comprises a linear voltage differential transformer mounted to the body, and ferromagnetic means carried by the stylus, the said transformer providing a unique electrical signal when the stylus is in one position along the first axis, and providing a different electrical signal representative of the direction and amount of axial movement of the stylus along said first axis from said one position.

16. In combination: apparatus according to claim 7; motor means responsive to the tracer mechanism causing the tracer mechanism to traverse the contour of a pattern in a selected plane defined by the first axis and a selected one of either the second or third axes; and connecting means connecting the axial force element to that one of the second and third power control means which is not respective to an axis defining said selected plane, whereby the said non-selected power control means causes application of power to energize the axial force element, whereby to exert a force directed away from the stylus tip in porportion to stylus deflection along the non-selected axis.

17. A system for tracing the surface of a pattern with the stylus of a tracer mechanism in a series of laterally spaced-apart trace cuts, all of which trace cuts begin at the same edge of the pattern, said system comprising: a tracer mechanism according to claim 8 in which said axial force means can distend said tracer stylus, a first axis motor, a second axis motor, and a third axis motor adapted to move the pattern along respective mutually perpendicular axes, respective to like axes of the tracer mechanism; limit means for terminating operation of the second axis motor at the end of a trace cut; means for causing the first axis motor to retract the tracer mechanism away from the pattern along the first axis; means for terminating the retract movement when it is completed; pick feed means for causing the third motor to move the tracer mechanism laterally relative to said plane; means for terminating the pick feed movement when it is completed; means for causing the second motor to move the tracer mechanism in a traverse movement in a direction opposite from the direction of the trace cut; means for terminating the traverse movement when it is completed; means to distend the stylus after the termination of the traverse movement; means to verify the distention of the stylus; means to cause the first motor to move the tracer mechanism toward the pattern at a predetermined rate of speed after the distention is verified until a predetermined point is reached by the stylus; means responsive to arrival at said predetermined point to retract the distended stylus; means effective after said retraction to cause the first motor to move the tracer mechanism toward the pattern at another rate of speed suitable for metal cutting until a predetermined stylus position is achieved; and means responsive to the attainment of the said position for starting a new trace cut after said predetermined stylus position is achieved, all in the order recited.

18. A system according to claim 17 in which the predetermined point is the elevation of a plateau above the pattern.

19. A system according to claim 17 in which the said predetermined point is the surface of the pattern.

20. A system according to claim 17 in which the predetermined position constitutes deflection of the stylus.

* * * * *